United States Patent [19]
Nauman et al.

[11] Patent Number: 5,149,112
[45] Date of Patent: Sep. 22, 1992

[54] BICYCLE CONVERSION BAR

[75] Inventors: Leonard G. Nauman, Golden Valley; Dale E. Stenberg, Bloomington, both of Minn.

[73] Assignee: Kidz First, Inc., Golden Valley, Minn.

[21] Appl. No.: 597,507

[22] Filed: Oct. 12, 1990

Related U.S. Application Data

[63] Continuation-in-part of Ser. No. 457,371, Dec. 27, 1989, Pat. No. 5,052,704.

[51] Int. Cl.⁵ .................... A63C 17/18; B62K 13/00
[52] U.S. Cl. .................... 280/7.11; 280/278; 280/287; 280/288.4
[58] Field of Search ......... 280/273, 278, 281.1, 280/287, 288.4, 293, 295, 304, 7.11

[56] References Cited

U.S. PATENT DOCUMENTS

| | | | |
|---|---|---|---|
| 443,482 | 12/1890 | Hunt | 280/281.1 X |
| 529,861 | 11/1894 | Hersh | 280/7.11 |
| 660,981 | 10/1900 | Barnes | 280/281.1 |
| 2,345,125 | 7/1944 | Johnston | 280/281.1 X |
| 3,113,785 | 12/1983 | Bohnenkamp | 280/287 X |

FOREIGN PATENT DOCUMENTS

| | | | |
|---|---|---|---|
| 811323 | 7/1949 | Fed. Rep. of Germany | 280/7.11 |
| 361436 | 7/1906 | France | 280/288.4 |
| 900078 | 6/1945 | France | 280/7.11 |
| 2239 | of 1897 | United Kingdom | 280/7.11 |
| 906 | of 1898 | United Kingdom | 280/7.11 |
| 23846 | of 1900 | United Kingdom | 280/7.11 |
| 184465 | 10/1923 | United Kingdom | 280/281.1 |

Primary Examiner—Charles A. Marmor
Assistant Examiner—Kevin Hurley
Attorney, Agent, or Firm—Moore & Hansen

[57] ABSTRACT

A conversion bar for converting a female style bicycle to a male bicycle. The bar is comprised of two, elongated sleeve segments telescoped together for sliding, longitudinal adjustment. Mounting assemblies are pivotally attached to the free end of each sleeve segment for angular orientation as required for secure mounting to the upright seat post and either the handle bar post or the diagonal frame tube at the front end of the bicycle. When so mounted, the conversion bar extends horizontally.

4 Claims, 2 Drawing Sheets

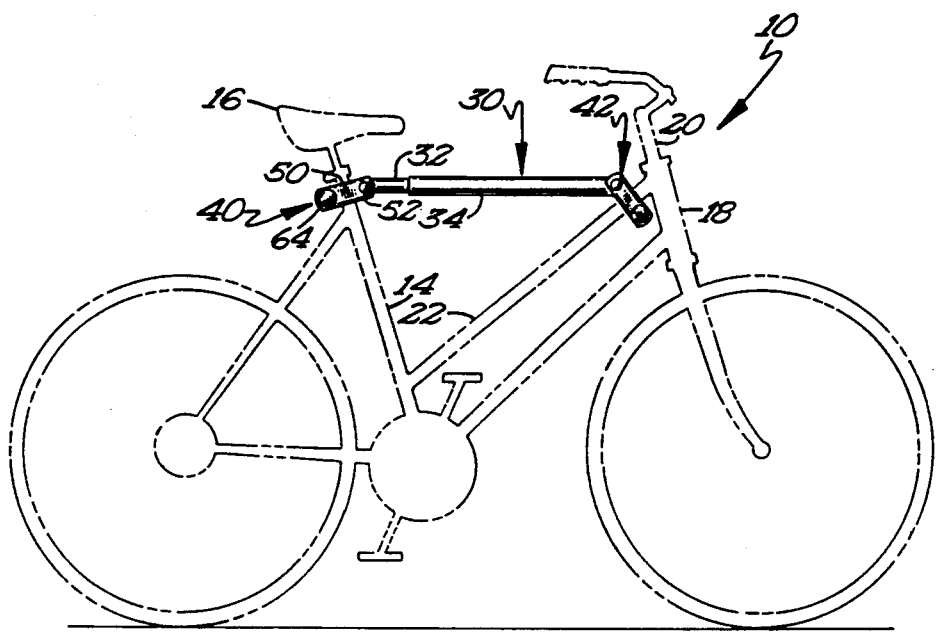
Fig 1
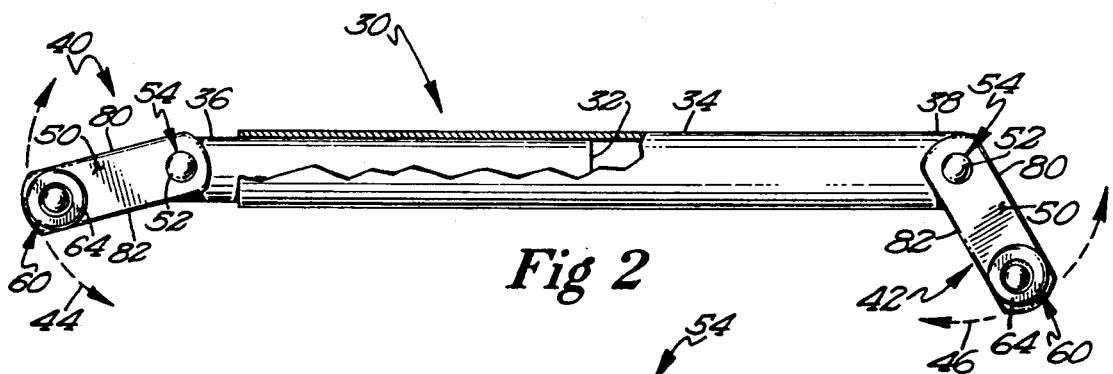
Fig 2
Fig 3

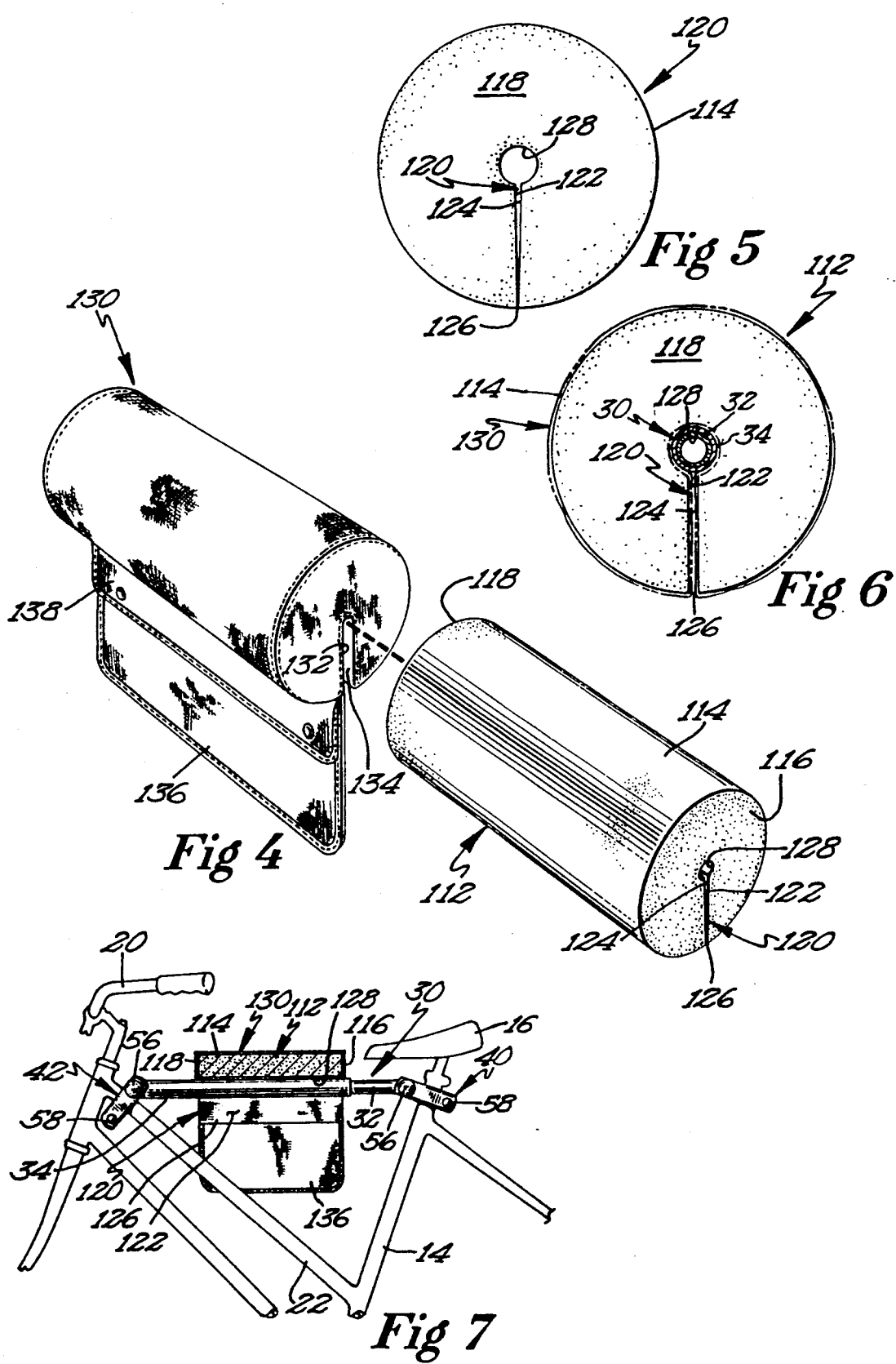

BICYCLE CONVERSION BAR

This case is a continuation in part of copending application Ser. No. 07/457,371, U.S. Pat. No. 5,052,704 entitled AUXILIARY SEAT FOR BICYCLES filed Dec. 27, 1989.

BACKGROUND OF THE INVENTION

The present invention relates to a conversion bar for converting a traditional female style bicycle into a traditional male style bicycle and to an auxiliary seat for carrying a passenger.

The bicycle has passed its century birthdate and has undergone many changes since it first appeared. Early in the development of the bicycle, the frames were split into two separate categories, one being intended for male use and the other for female use. Hence the terminology "man's style" and "woman's style" of bicycle developed along with the apparatus itself. The only significant difference between the two types of frames as they are presently constituted is that the frame of the woman's style bicycle lacks the horizontal bar extending between the seat tube and the handle bar tube. This generally does not present any problems, though it does weaken the frame somewhat However, there has been a need or at least a desire shown in the prior art to carry passengers on the bicycle. The lack of the horizontal bar on the woman's style bicycle has relegated the passenger to a position on an auxiliary seat mounted rearwardly of the main seat. The option of a front mounted seat was not available due to the missing horizontal bar.

The major problem with a rear mounted seat is that the bicycle rider is unable to maintain visual contact with the passenger. Additionally, the rearward disposition of such seats behind the main bicycle seat generates momentum when negotiating turns that creates a tendency to throw the passenger sideways off the rearwardly disposed seat. The passenger's view is also substantially blocked from the main rider, thus detracting from the riding experience of the rearwardly seated passenger. Rearwardly mounted seats also required special hardware and fasteners by means of which they are typically permanently attached to the bicycle rear fender or frame. Thus a need exists for a readily mountable conversion bar to convert a female style bicycle to a male style bicycle and thereby provide a mount location for a front mounted auxiliary seat or other attachments.

BRIEF SUMMARY OF THE INVENTION

It is a principal object of the present invention to provide a new and improved apparatus for converting a female style bicycle frame to a male style bicycle frame.

It is another object of the present invention to provide a conversion bar readily mountable between the seat tube and the diagonal tube of a female style bicycle frame.

It is yet another object of the present invention to provide a mounting location forwardly disposed of the main seat for an auxiliary seat for carrying passengers on a female style bicycle and an auxiliary seat therefor.

There is provided according to the present invention a conversion bar for converting a traditional female style bicycle into a traditional male style bicycle. The conversion bar includes first and second telescoping sleeves, each sleeve having a mounting means for mounting the conversion bar to a bicycle frame member disposed at opposite ends thereof In a preferred embodiment, each mounting means comprises a pair of spaced apart plates pivotally attached to a sleeve end and includes a pair of mutually opposed shock absorber/tube protector means.

In operation, one mounting means is used to attach one end of the conversion bar to the diagonal tube of a bicycle adjacent to the handle bar tube and the other mounting means is used to attach the other end of the conversion bar to the saddle pillar of the bicycle, thereby providing a horizontally extending bar similar to the bar found in the traditional male bicycle. By so converting the female bicycle, a rest for an auxiliary seat or other bicycle attachment is provided. The auxiliary bicycle seat of this invention is particularly characterized by a seat structure which can be quickly and easily slipped in place over the horizontal bar of a bicycle between the main seat and the handle bar, and which may be slidably adjusted along the length of that horizontal bar, without the need for any special clamps, hardware, brackets, or tools of any kind for the installation or adjustment of the auxiliary seat.

These basic objectives are realized by forming the auxiliary seat as an elongated, preferably cylindrical cushion having a slot extending lengthwise of the cushion and terminating at its lower end in a continuous opening in the bottom of the cushion which extends through the outer cushion surface. The upper end of the slot is closed and terminates within the body of the seat cushion. The cushion may thus be removably mounted on the horizontal bar of a bicycle between the main seat post and the handle bar by forcing the opening in the bottom of the slot downwardly over the horizontal bar so that the slot slides over the bar, until the closed end of the slot is brought into firm engagement with the horizontal bar. The cushion is made of material which is dense enough to support the weight of a rider, yet is sufficiently resilient that the portions of the cushion along the side walls of the slot spring inwardly towards each other to firmly embrace the bar of the bicycle after the cushion is in place.

As a particularly advantageous feature, the upper end of the aforesaid slot in the seat cushion terminates in a tubular passage which is sized and adapted to fit snugly around the horizontal bar of a bicycle. The tubular passage is preferably of a lesser diameter than the horizontal bicycle bar which it embraces, as a result of which the resilient walls of the tubular passage within the body of the cushion squeeze tightly around the horizontal bar and firmly embrace it so as to hold the auxiliary seat cushion in place.

A further beneficial aspect of the auxiliary seat resides in its uniform, cylindrical shape. With such a shape, a person seated on the cushion will be comfortably supported at any position along the length of the seat cushion, and will not suffer any discomfort if the cushion should rotate slightly on the horizontal bar of the bicycle. Various materials may be utilized to make the auxiliary seat of such a cylindrical shape. Polyurethane foam has been found to be particularly desirable.

These and other objects and advantages of the invention will become readily apparent as the following description is read in conjunction with the accompanying drawings wherein like reference numerals have been used to designate like elements throughout the several views.

BRIEF DESCRIPTION OF THE DRAWINGS

FIG. 1 shows in phantom a side view of a bicycle having a female style frame and a conversion bar according to the present invention mounted thereon;

FIG. 2 illustrates in greater detail and partially in cross section, the embodiment of the conversion bar shown in FIG. 1;

FIG. 3 shows a top view of an attachment mechanism for attaching the conversion bar of the present invention to the bicycle;

FIG. 4 is a perspective view of the auxiliary seat showing the seat cover removed in exploded relation to the seat cushion;

FIG. 5 is an end view of the auxiliary seat in its normal position of non-use;

FIG. 6 is a front end view of the seat in the condition it assumes when mounted on the conversion bar of the present invention, with the bar being shown in vertical section; and FIG. 7 is a side elevation view of a bicycle showing the auxiliary seat mounted on the conversion bar.

DETAILED DESCRIPTION OF THE PRESENT INVENTION

FIG. 1 depicts in a side elevation, partially phantom view, a bicycle 10 having a conversion bar in accordance with the present invention mounted thereon. Bicycle 10 is of the traditionally denominated female style type having a frame 12 including a first generally upright post such as seat tube 14 mounting a main seat 16 and a second generally upright post such as handle bar tube 18 supporting handle bars 20. A diagonal tube 22 extends between the lower portion of seat tube 14 and the upper portion of handle bar tube 18. A conversion bar 30 in accordance with the present invention is shown extending between seat tube 14 and diagonal tube 22. Conversion bar 30 is mounted to bicycle 10 with one end attached just below seat 16 and the other attached to the top end of diagonal tube 22. In such a disposition, conversion bar 30 is substantially horizontal to the riding surface and defines with seat tube 14 and handle bar tube 18 a triangular frame segment. Conversion bar 30 could also be attached to handle bar tube 18

FIG. 2 illustrates in greater detail the conversion bar 30 depicted in FIG. 1. Conversion bar 30 comprises an inside sleeve 32 removably insertable into an outside sleeve 34 to form a telescoping, adjustable conversion bar. Sleeves 32 and 34 respectively include free ends 36 and 38 to which attachment mechanisms 40 and 42 are respectively attached. Each attachment mechanism 40, 42 is pivotally connected to its respective free-end 36, 38 as indicated by arrows 44 and 46 respectively. While shown as a cylindrical in configuration, sleeves 32 and 34 could also have other nesting cross-sectioned shapes.

FIG. 3 illustrates in a top plan view an attachment means in accord with the present invention. Attachmemt means 40 is depicted in the Figure, though it should be understood that means 42 is substantially identical with only minor differences as will be noted later. As shown, attachment means 40 comprises a pair of spaced apart, parallel plates 48 and 50 attached on opposite sides of tube 32. Plates 48 and 50 are pivotally connected to tube 32 by means of a low profile bolt 52 extending transversely through free end 36 of tube 32 and by a threaded fastener 54 attached to the threaded end (not shown) of bolt 52. Threaded fastener 54 may be of the type shown in the Figure wherein a knob 56 includes a recessed nut (not shown) that is threaded onto the threaded end of bolt 52. Knob 56 may have a threaded receptacle capable of receiving the threaded end of bolt 52. The pivoting attachment provided by bolt 52 and fastener 54 enables attachment means 40 to be pivoted about the axis of bolt 52 to aid in the proper positioning of conversion bar 30 on bicycle 10 and to accommodate thereby different bicycle sizes and different angular dispositions between seat tube 14 and diagonal tube 22 or between seat tube 14 and handlebar tube 18.

Attachment means 40 further includes a second low profile bolt 58 extending through plates 48 and 50 at the opposite end of plates 48 and 50. A threaded fastener 60 similar to threaded fastener 54 is provided for turning onto threaded end 62 of bolt 58. As with threaded fastener 54, threaded fastener 60 may comprise a knob 64 including a threaded nut (not shown) for threading onto the end 62 of low profile bolt 58. Preferably, the plates 48 and 50 and the heads of bolts 52 and 58 are mutually configured such that bolts 52 and 58 are received by their respective plates in a non-rotational manner. With such a configuration, conversion bar 30 may be attached to bicycle 10 without the use of any tools.

Attachment means 40 and 42 may each include cushioning means to reduce the transmission of road generated forces through the conversion bar and to protect the respective points of attachment of conversion bar 30 to bicycle 10 from scratching or other damage. Thus, as shown in FIG. 3, a shock absorbing cushioning means 66 comprising first and second cushions 68 and 70 are respectively attached to plates 48 and 50. Cushions 68 and 70 may include a substantially concave surface 72 and 74 respectively to closely conform to the seat tube 14. Preferably, each surface is configured as a partial cylindrical surface. Various materials may be used for the cushioning means, rubber being preferred.

Also shown in FIG. 3 is a depression 76 disposed at the end 36 of tube 32. A similar depression is disposed on the opposite side of sleeve 32. This depression 76 is a safety feature that positions edge 78 of sleeve 32 below the top and bottom edges 80 and 82 of plates 48 and 50 respectively. By keeping edge 78 inside of edges 80 and 82, the rounded end of tube 32 does not project into an area of potential interference with the bicycle rider As previously noted, attachment means 42 is substantially identical to attachment means 40. The primary difference between the two stems from the larger diameter of outer sleeve 34 as compared to inner sleeve 32. As a result, the low-profile bolts used in attachment means 42 are slightly longer and the cushions utilized between the plates of attachment means 42 are slightly larger also.

While conversion bar 30 is shown with inner sleeve 32 attached to seat post 14 and outer sleeve 34 attached to diagonal tube 22, bar 30 could just as easily be reversed such that attachment means 42 of tube 34 is removably connected to seat tube 14 and attachment means 40 of inner sleeve 32 is attached to diagonal tube 22 on handle bar tube 18. The pivotal connections of attachment means 40 and 42 to sleeves 32 and 34 respectively as well as the telescoping arrangement of sleeve 32 within sleeve 34 provides a conversion bar 30 which is readily adjustable to bicycles having varying distances between desired attachment points on the seat tube and the diagonal or handle bar tubes, and which adjusts also for varying angles between the seat tube and the other attachment tube. Sleeves 32 and 34 and the parallel plates of means 40 and 42 may be manufactured from a variety of materials, including metals such as aluminum or alloys such as steel or a synthetic material. Additionally, plates 48 and 50, if manufactured of a metal or alloy, may be coated with a synthetic material to reduce the possibility of injury from a sharp plate edge.

With the conversion bar of the present invention attached to a female style bicycle as shown in FIG. 1, a mount for a front mounted auxiliary seat is readily available. An exemplary embodiment of such an auxiliary seat is shown in FIGS. 4-7.

The auxiliary seat is generally indicated by reference numeral 112. The seat is preferably formed in the shape of an elongated, cylindrical body 114 made of material having sufficient density to support the weight of a person. Although various materials may be utilized for forming such a seat, polyurethane foam of at least medium density has been found to be particularly suitable. The cylindrical seat body 114 has opposed end walls 116 and 118.

Extending lengthwise over the entire length of the seat body 114 is an elongated slot 120 defined by opposed side walls 122 and 124. Slot 120 terminates at its lower end in a continuous opening 126 extending through the outer surface of cylindrical body 114. At its upper end, slot 120 is closed, and preferably terminates in a tubular passage 128 as shown most clearly in FIGS. 5 and 6.

As may be noted by reference to FIGS. 6 and 7, slot 120 extends substantially vertically when the seat cushion is oriented horizontally for mounting on the horizontal bar of a bicycle, with tubular passage 128 being located substantially along the longitudinal central axis of the seat cushion body 114. Thus, slot 120 extends vertically between continuous opening 126 at the bottom thereof and tubular passage 128 at the upper end of slot 120. Elongated passage 128 is advantageously sized so that it will be of a lesser diameter than the conversion bar 30. As a result, tubular passage 128 will be stretched radially so as to compress the material of seat body 114 surrounding it, when slot 120 is forced downwardly over the bicycle conversion bar 30. Thus, after installation on the conversion bar 30 of the bicycle to the position shown in FIG. 7, the resilient material of seat body 114 will spring back inwardly around conversion bar 30 in secure, embracing engagement therewith. In this way, the auxiliary seat 112 is firmly held in place on the horizontally disposed conversion bar without the need of any special mounting hardware or brackets or special fasteners.

It will thus be seen that auxiliary seat 112 can be quickly and easily mounted on the conversion bar 30, forwardly of the main seat by simply positioning seat body 114 on top of the bar with continuous opening 126 of slot 120 aligned longitudinally with the bar. Downward force applied to the seat body 114 will force slot 120 downwardly over the conversion bar 30. As this happens, the side walls 122 and 124 of slot 120 will be initially spread apart and then return to their normal position closely adjacent to each other. Side walls 122 and 124 are preferably slightly tapered upwardly and outwardly as shown in FIG. 5. After slot 120 is pushed downwardly over its full extent so as to bring elongated passage 128 against and around the horizontal bicycle conversion bar 30, side walls 122 and 124 of slot 120 will close together as shown in FIG. 6. Any gap between side walls 122 and 124 as shown in FIG. 6 will be less than the width or diameter of the conversion bar 30. As a result, side walls 122 and 124 will be urged inwardly towards each other, as will the material of cushion body 114 defining tubular passage 128. This provides a tight fit of tubular passage 128 around conversion bar 30, which serves to securely hold the auxiliary seat 112 in place.

After removable mounting on the conversion bar 30 of a bicycle as shown in FIG. 7, the auxiliary seat 112 may be readily adjusted along the length of conversion bar 30 by simply sliding it back and forth. Tubular passage 128 facilitates such slidable adjustment. The location of seat 112 on conversion bar 30 may be longitudinally adjusted in such a manner so that the person seated thereon may comfortably grasp the handle bars 20 to hold himself on the bicycle. Also, the uniform, cylindrical shape of seat body 114 permits the passenger to rest comfortably on the auxiliary seat at any location along its length; and even if the seat body 114 should rotate slightly around bicycle conversion bar 30, the uniform geometry of seat body 114 will present a comfortable surface to the passenger.

Although not essential, a cover generally indicated by reference numeral 130 and shown most clearly in FIG. 4 may be provided around seat body 114. Cover 130 may be made of nylon, or of any other suitable, durable material. Cover 130 is preferably made so that it totally covers all of the outer surface of seat body 112, including end walls 116 and 118. Preferably, cover 130 is formed with vertically extending, slot segments 132 and 134 folded upwardly in the center thereof so as to conform to and overlie side walls 122 and 124 of slot 120 in seat body 114. In this way, cover side walls 132 and 134 serve to protect the portions of seat body 114 defining slot side walls 122 and 124 so as to avoid excessive wear on the slot portions of seat body 114 in the course of frequent mounting on and removal from a bicycle bar. FIG. 6 shows cover 130 in phantom as it would be positioned in embracing relation to seat body 114, and extending within slot 120.

Cover 130 may also be formed to include a downwardly depending pocket 136 having a closure flap 138 snapped in place thereon. This permits the carrying of articles on seat cover 130. Although shown depending downwardly directly under slot opening 126, pocket 136 could be formed integrally with cover 130 at any point along the length thereof, around its periphery.

The particular benefits to be derived from the converted bicycle and the auxiliary seat disclosed herein are readily apparent. The passenger—most often a child—is seated in front of the adult where he has full visibility, and where the adult can at all times have full visual contact with the child passenger. The adult and the child are comfortably positioned closely adjacent to each other so that they may converse and enjoy a bicycle ride together. The child may adjust himself along the length of removable auxiliary seat 112 so that he may comfortably grasp the handlebars 20. The child may also slidably adjust seat 12 along the length of horizontal bicycle conversion bar 30, as may be necessary and appropriate. Auxiliary seat 112 is compact and of light weight, and may be readily slipped onto and off of bicycle conversion bar 30 by way of slot 120 in seat body 114. No special tools are required for that purpose.

It is anticipated that various changes may be made in the size, shape, and construction of the conversion bar and of the auxiliary bicycle seat disclosed herein without departing from the spirit and scope of the invention as defined by the following claims.

We claim:

1. A conversion bar for converting a female-style bicycle of the type having first and second spaced apart upright posts and a tube extending diagonally therebetween to a male-style bicycle, said conversion bar comprising:

first and second telescoping sleeves, each said sleeve having a free end;

a first mounting means attached to said free end of said first sleeve, said first means for mounting said conversion bar to the first post; and a second mounting means attached to said free end of said second sleeve, said second means for mounting said conversion bar to the diagonal tube or said second post such that said conversion bar is disposed substantially horizontally to the riding surface;

wherein said first and second mounting means each comprise:

first and second spaced apart mounting member pivotally attached to its respective sleeve free end for embracing engagement with said bicycle post and diagonal tube, whereby said mounting means may be angularly adjusted with respect to said sleeves as required for attachment to said bicycle posts and diagonal tube; and shock absorbing means attached to each said mounting means for absorbing road generated shock forces and protecting its respective post or tube from damage thereby, at least one of said shock absorbing means comprising first and second cushions attached to mutually facing sides of said first and second mounting members respectively.

2. The conversion bar of claim 1 wherein each said cushion includes a substantially partial cylindrical mating depression for closely conforming to a post.

3. In combination with a female-style bicycle having first and second generally upright, spaced apart seat and handle bar posts and a tube extending diagonally therebetween, a conversion bar for converting said bicycle from a female-style of bicycle to a male-style of bicycle, said conversion bar comprising:

first and second telescoping sleeves, each sleeve having a free end;

a first mounting means attached to said free end of said first sleeve, said first means mounting said conversion bar to said first post; and a second mounting means attached to said free end of said second sleeve, said second means mounting said conversion bar to said diagonal tube such that said conversion bar is substantially horizontally disposed relative to a riding surface; wherein said first and second mounting means each comprise first and second spaced apart mounting members pivotally attached to its respective sleeve free end and each said mounting means includes shock absorbing means attached thereto for absorbing road generated shock forces, at least one of said shock absorbing means comprising first and second cushions attached to mutually facing sides of said first and second mounting members respectively.

4. The combination of claim 3 wherein each said cushion includes a curved mating depression closely conforming to its respective post and diagonal tube.

* * * * *